US008478898B2

(12) United States Patent
Harvey et al.

(10) Patent No.: US 8,478,898 B2
(45) Date of Patent: Jul. 2, 2013

(54) SYSTEM AND METHOD FOR ROUTING DIRECTORY SERVICE OPERATIONS IN A DIRECTORY SERVICE NETWORK

(75) Inventors: Richard Hans Harvey, Ringwood East (AU); Ronald William Ramsay, Ringwood (AU)

(73) Assignee: CA, Inc., Islandia, NY (US)

( * ) Notice: Subject to any disclaimer, the term of this patent is extended or adjusted under 35 U.S.C. 154(b) by 1288 days.

(21) Appl. No.: 11/269,551

(22) Filed: Nov. 9, 2005

(65) Prior Publication Data
US 2007/0106815 A1 May 10, 2007

(51) Int. Cl.
G06F 15/16 (2006.01)

(52) U.S. Cl.
USPC .......................................................... 709/238

(58) Field of Classification Search
USPC .......................................................... 709/238
See application file for complete search history.

(56) References Cited

U.S. PATENT DOCUMENTS

| | | | | |
|---|---|---|---|---|
| 5,774,660 | A | 6/1998 | Brendel et al. ............ | 395/200.31 |
| 6,047,103 | A | 4/2000 | Yamauchi et al. ............... | 386/94 |
| 6,292,905 | B1 | 9/2001 | Wallach et al. .................... | 714/4 |
| 6,345,266 | B1 | 2/2002 | Ganguly et al. ................... | 707/1 |
| 6,615,223 | B1 | 9/2003 | Shih et al. ...................... | 707/201 |
| 6,651,070 | B1 * | 11/2003 | Hirashima et al. ............. | 707/102 |
| 6,680,942 | B2 | 1/2004 | Mead et al. .................... | 370/392 |
| 6,856,989 | B1 | 2/2005 | Zhou et al. ......................... | 707/9 |
| 7,082,500 | B2 | 7/2006 | Scott et al. ..................... | 711/141 |
| 7,290,053 | B2 | 10/2007 | Nanda et al. .................... | 709/225 |
| 7,580,971 | B1 * | 8/2009 | Gollapudi et al. ............. | 709/203 |
| 2002/0004848 | A1 | 1/2002 | Sudarshan et al. ............ | 709/310 |
| 2002/0095454 | A1 | 7/2002 | Reed et al. ..................... | 709/201 |
| 2002/0120685 | A1 | 8/2002 | Srivastava et al. ............ | 709/203 |
| 2002/0169887 | A1 | 11/2002 | MeLampy et al. ............. | 709/231 |
| 2002/0188614 | A1 | 12/2002 | King ............................. | 707/100 |
| 2003/0059004 | A1 | 3/2003 | Jiang et al. ................. | 379/88.17 |
| 2003/0067912 | A1 * | 4/2003 | Mead et al. .................... | 370/389 |
| 2003/0120723 | A1 | 6/2003 | Bright et al. .................. | 709/203 |
| 2003/0144894 | A1 | 7/2003 | Robertson et al. ................ | 705/8 |
| 2003/0154375 | A1 | 8/2003 | Yang ............................. | 713/172 |
| 2003/0174648 | A1 * | 9/2003 | Wang et al. .................... | 370/235 |

(Continued)

OTHER PUBLICATIONS

Foster, Ian, "The Anatomy of the Grid: Enabling Sealable Virtual Organizations", In Book Series Lecture Notes in Computer Science, *Proceedings of the 1st International Symposium on Cluster Computing and the Grid*, CCGRID '01, IEEE, 2001, 2 pages.

(Continued)

*Primary Examiner* — Sulaiman Nooristany
(74) *Attorney, Agent, or Firm* — Pillsbury Winthrop Shaw Pittman LLP

(57) ABSTRACT

A system and method are provided for routing directory service operations in a directory service network. A router may be included in a directory service network. The router may include a server knowledge list that maintains information about one or more directory servers in the directory service network. Directory service operations may be received by the router and may be routed to an appropriate directory server based on availability one or more of the directory servers.

17 Claims, 9 Drawing Sheets

U.S. PATENT DOCUMENTS

| | | | |
|---|---|---|---|
| 2004/0059609 A1 | 3/2004 | Chatlain et al. | 705/4 |
| 2004/0066789 A1 | 4/2004 | Kobayashi | 370/402 |
| 2004/0172445 A1 | 9/2004 | Singh et al. | 709/200 |
| 2004/0252707 A1 | 12/2004 | Crocker et al. | 370/402 |
| 2005/0021725 A1 | 1/2005 | Lobbert | 709/223 |
| 2005/0086326 A1 | 4/2005 | Manning et al. | 709/219 |
| 2005/0102429 A1* | 5/2005 | Pinhas et al. | 709/248 |
| 2005/0203897 A1 | 9/2005 | Kapitskaia et al. | 707/3 |
| 2006/0064720 A1 | 3/2006 | Istvan et al. | 725/38 |
| 2006/0085425 A1 | 4/2006 | Lauer et al. | 707/10 |
| 2006/0155756 A1 | 7/2006 | Stanev et al. | 707/103 R |
| 2006/0156313 A1 | 7/2006 | Hambrick et al. | 719/315 |

OTHER PUBLICATIONS

Bennett et al., "An Analysis of Replication Strategies for X.500-like Distributed Directories", Workshop on the Management of Replicated Data, 1990, Proceedings, Nov. 8-9, 1990, pp. 137-142.

In U.S. Appl. No. 11/269,637, a non-final Office Action was mailed on Feb. 11, 2013, 20 pages.

* cited by examiner

SYSTEM AND METHOD FOR ROUTING DIRECTORY SERVICE OPERATIONS IN A DIRECTORY SERVICE NETWORK

CROSS REFERENCE TO RELATED APPLICATIONS

This application is related to the following applications which are being filed concurrently, and which are incorporated herein by reference: "System and Method for Providing a Directory Service Network," U.S. patent application Ser. No. 11/269,638 (U.S. Patent Application Publication No. 20070118632); and "System and Method for Efficient Directory Performance Using Non-Persistent Storage," U.S. patent application Ser. No. 11/269,637 (U.S. Patent Application Publication No. 20070106691).

This application is also related to the following co-pending applications, which are incorporated herein by reference: "Method and System for Configuring a Supplemental Directory," U.S. patent application Ser. No. 11/270,794 (U.S. Patent Application Publication No. 20070112790); "Method and System for Providing Enhanced Read Performance for a Supplemental Directory," U.S. patent application Ser. No. 11/270,795 (U.S. Patent Application Publication No. 20070112791); "Method and System for Improving Write Performance in a Supplemental Directory," U.S. patent application Ser. No. 11/270,896 (U.S. Patent Application Publication No. 20070112877); "Method and System for Automatic Registration of Attribute Types," U.S. patent application Ser. No. 11/270,320 (U.S. Patent Application Publication No. 20070106699); "System and Method for Writing Data to a Directory," U.S. patent application Ser. No. 11/270,188 (U.S. Patent Application Publication No. 20070112812); and "Method and System for Providing a Directory Overlay," U.S. patent application Ser. No. 11/270,793 (U.S. Patent Application Publication No. 20070112789).

This application is also related to the following applications, which were filed on May 20, 2005, and are incorporated herein by reference: "Method and Apparatus for Enhancing Directory Performance," U.S. patent application Ser. No. 11/134,047 (U.S. Patent Application Publication No. 20050267857); "Method and Apparatus of Optimizing Directory Performance," U.S. patent application Ser. No. 11/134,143 (U.S. Patent Application Publication No. 20050267858); "Method and Apparatus for Handling Directory Operations," U.S. patent application Ser. No. 11/134,251 (U.S. Patent Application Publication No. 20060106848); "Method and Apparatus for Loading Data into an Alternate Evaluator for Directory Operations," U.S. patent application Ser. No. 11/134,043 (U.S. Patent Application Publication No. 20060294114); "Structure of an Alternate Evaluator for Directory Operations," U.S. patent application Ser. No. 11/134,237 (U.S. Patent Application Publication No. 20050267859); and "Method of Selecting a Processor for Query Evaluation," U.S. patent application Ser. No. 11/134,070 (U.S. Patent Application Publication No. 200502734571).

FIELD OF THE INVENTION

The invention relates to a system and method of routing directory service operations in a network using non-persistent storage.

BACKGROUND OF THE INVENTION

Directory services are commonly used to manage network resources. A directory service typically organizes electronic content and runs on a directory server. The directory service interfaces to a directory which holds information about objects that are to be managed by the directory service.

Directories differ from databases in several ways. A primary difference is that information in a directory is generally read more often than it is written. Still, information has to at times be written to directories. Additionally, data in a directory is accessed using one or more directory service protocols. A client requesting from a directory need not know which physical device stores the data. There is an ongoing need to increase directory read and write performance without sacrificing consistency and reliability.

Past attempts to increase read and write performance have resulted in increased complexity of operations and increased cost. Previous attempts at increasing read performance have included the use of various caching techniques. However, in a mixed read/write environment, read performance still suffers in order to maintain consistent information. Caching as well as turning off transaction logging has been used in attempts to increase write performance. However, these techniques do not ensure reliability because information may be lost in the event of a power failure or other service interruption.

The inventor has determined that it would be desirable to provide a system and method to increase both read and write performance of existing systems without sacrificing consistency and reliability.

SUMMARY OF THE INVENTION

A system and method are provided for routing directory service operations in a directory service network. The directory service network may comprise a plurality of directory servers. Each directory server may include a communications interface, a non-persistent storage mechanism, an evaluation module, and a directory server knowledge module. A router may be provided for receiving directory service operations, determining which directory servers may evaluate a directory service operation, and forwarding the directory service operation to the appropriate directory server.

The router may include a directory server knowledge module, an evaluation module, and a routing module. The directory server knowledge module may be configured to maintain information about each directory server in the directory service network. This information may include an indication of the server's availability, a time associated with the last operation performed by the server, and/or other status information.

The evaluation module may be configured to determine which of the directory servers is available to evaluate the directory service operation. Additionally, the evaluation module may be configured to load share among the directory servers. Once a directory server has been selected, the router forwards the directory service operation to the selected directory server.

In operation, a directory service operation may be received by the router. The router may then determine one or more of a plurality of directory servers that are available to process the directory service operation. The router may then select one of the directory servers based on availability. The selection may additionally, be based on the type of routing technique being used. The router then forwards the directory service operation to the selected directory server.

According to some embodiments of the invention, the router may be configured to receive notification that one of the network directory servers has become disconnected, or

DETAILED DESCRIPTION OF PREFERRED EMBODIMENTS

In accordance with various disclosed embodiments, a system and method are provided for efficient directory service performance. Persistent writes to disk or other permanent storage need not be a mandatory part of a directory server. For example, transient data such as a session object created when a user logs into a system, need not be maintained once the user logs out. In another example, tasks created as a part of a workflow application need not be maintained once the task is complete.

In both of the above examples, the data is created as required and it is not necessary that the data pre-exist before being used. Furthermore, the data may be removed once its usage is complete, and the data need not survive a machine failure because the data may be regenerated as needed. Leveraging these concepts, the present invention uses non-persistent information storage to expedite the data read and write processes.

Figure 1:
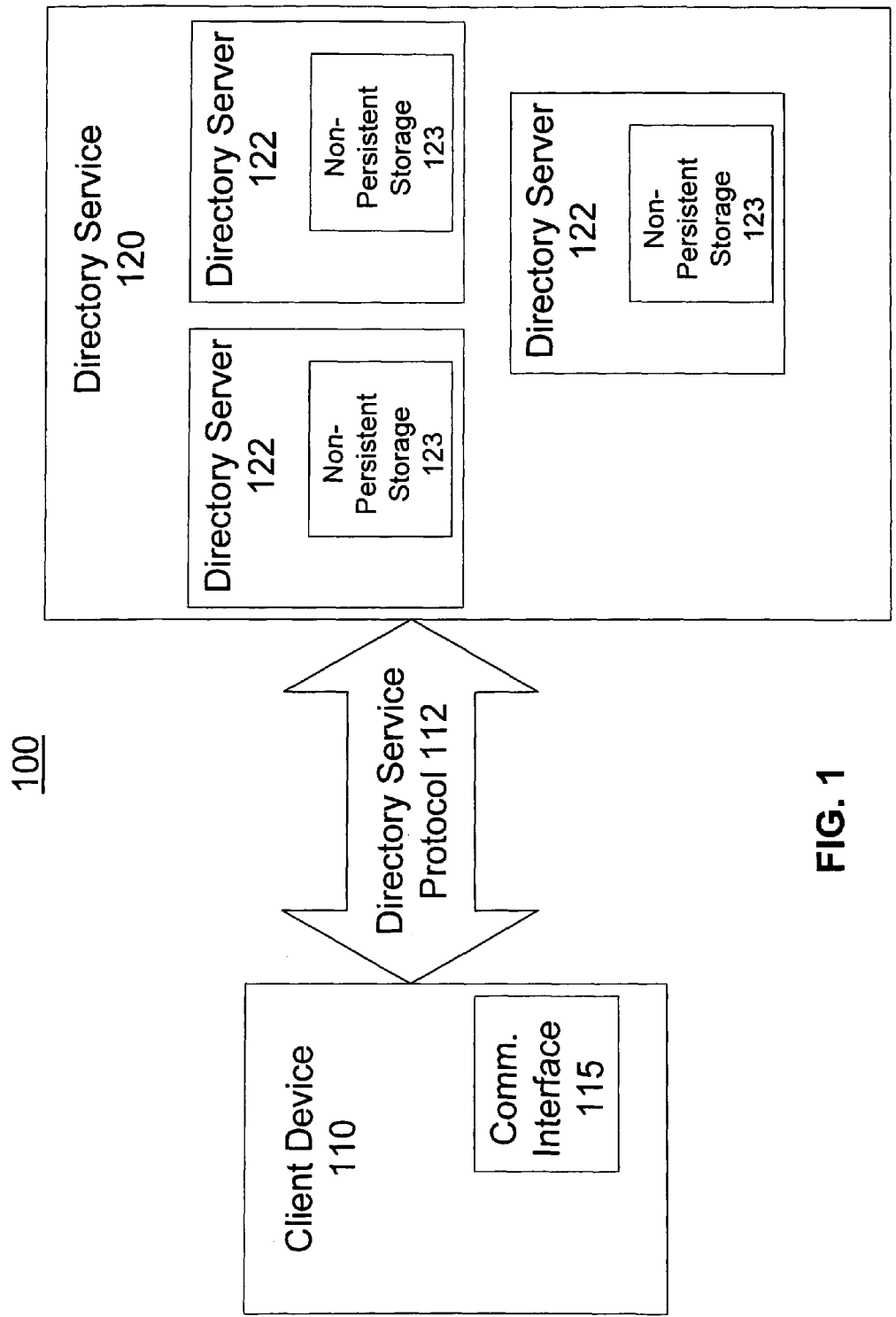
FIG. 1 illustrates client/server directory service system, in accordance with various embodiments of the invention.

FIG. 1 depicts a client/server system 100 for providing efficient directory service access, according to some embodiments of the invention. System 100 may include client 110 communicatively coupled over a network to directory service network 120. Client 110 and directory service network 120 may communicate using one or more directory service protocols 112. Directory service network 120 may include one or more directory servers 122.

Client 110 may be a person, an application, a directory, and/or any network accessible electronic device. For example, client device may be a desktop computer, a laptop computer, a portable digital assistant, a wireless telephone, and/or other electronic devices. Client 110 may include a directory services communication interface 115 enabling communication with directory service network 120.

Directory service protocols 112 may include any known or proprietary directory service protocols such as, for example, lightweight directory access protocol (LDAP), X.500, directory service markup language (DSML), and/or other directory service protocols. Directory service protocols 112 enable a user at client device 110 to access one or more directory entries stored on one or more of directory servers 122.

Directory services 112 enable clients to locate directory entries and attributes associated with the entries. Each directory server 122 may store directory entries in a hierarchical, tree-like structure. Each directory entry may comprise a collection of attributes having a distinguished name. Additionally, each entry's attributes may have a type and one or more values. The distinguished name may be constructed by taking the name of the entry, known as the relative distinguished name, and concatenating the names of its ancestors in the hierarchy.

Directory service protocols 112 define a plurality of operations for accessing data stored with the directory service network. For example, the protocol may define operations for searching the directory, adding an entry, updating an entry, deleting an entry, and/or other operations. When client device 110 issues a directory service operation, the client need not be aware of which directory server 122 is responsible for evaluating the operation.

According to an exemplary embodiment of the invention, one or more directory servers 122 may include non-persistent storage mechanism 123. In a typical client/server directory service arrangement, a persistent storage mechanism, such as a database, file system, and/or other permanent storage device may be used for evaluating directory service operations. As used herein, persistent storage refers to permanent, static, long-term storage mechanisms. Persistent data is used herein to refer to data that is read from and/or written to a persistent storage mechanism. Each time a read or write directory operation is performed, the responding directory server consults the persistent storage device to either retrieve an object or write an object to the storage device. However, as described above, many directory service operation do not require permanent storage.

Figure 2:
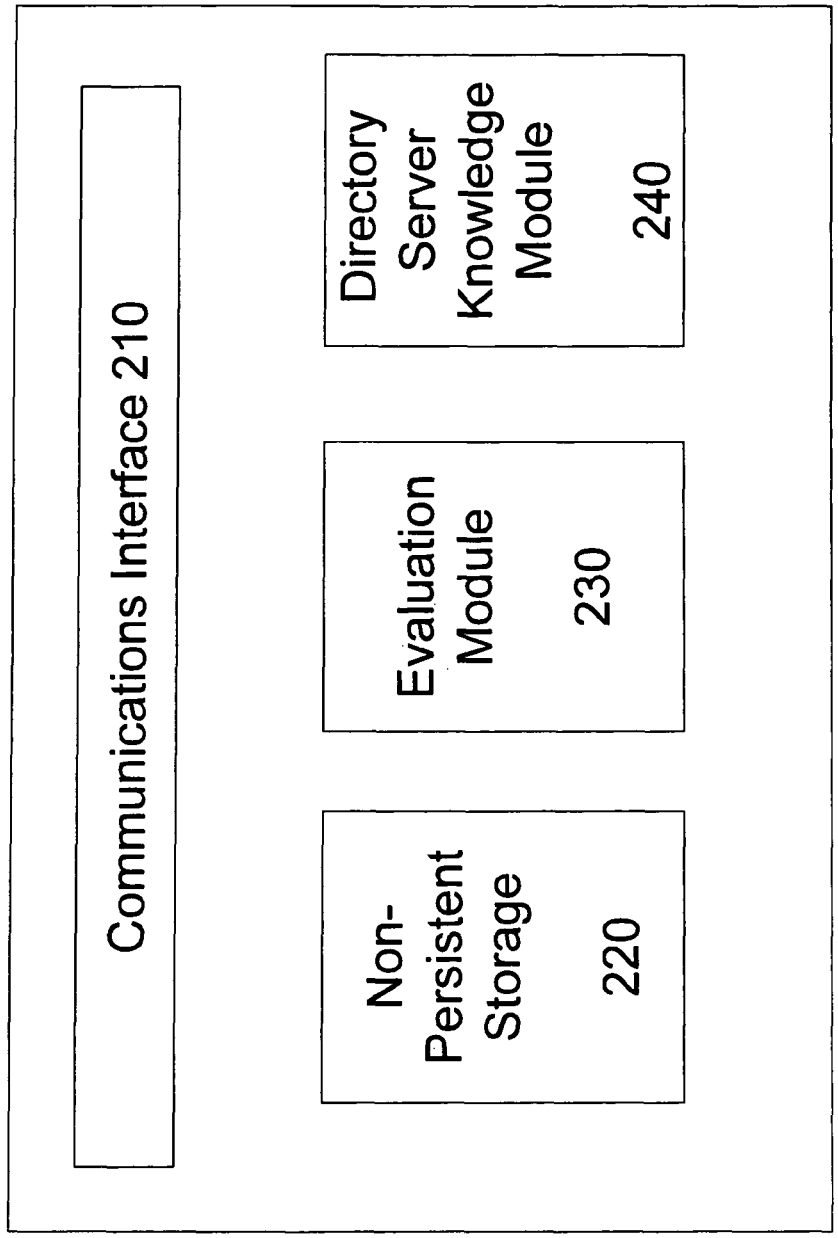
FIG. 2 illustrates a directory server, in accordance with various embodiments of the invention.

Referring now to FIG. 2, a directory server 200 is depicted, in accordance with various embodiments of the invention. Directory server 200 may include a communications interface 210, a non-persistent storage mechanism 220, and evaluation module 230. Additionally, directory server 200 may include directory server knowledge module 240.

Communications interface 210 may be configured to receive directory service operations from one or more client devices. Additionally, communications interface 210 may be configured to forward directory service operations to other directory servers or to receive forwarded directory service operations when connected as part of a network.

Directory server 200 may include non-persistent storage mechanism 220. Non-persistent storage mechanism 220 may be a portion of memory associated with server 200, according to some embodiments of the invention. While depicted in FIG. 2 as internal to directory server 200, non-persistent storage mechanism 220 may be an external storage mechanism. Non-persistent storage mechanism 220 may initially be empty, according to some embodiments of the invention. In other embodiments, non-persistent storage mechanism 220 may be initialized with information stored in other persistent or non-persistent storage mechanisms. Updates to the data, such as modifications, additions, and/or deletions, may be stored in non-persistent storage mechanism 220. Additionally, read operations may be evaluated with respect to the data stored in non-persistent storage mechanism 220.

According to some embodiments of the invention, non-persistent storage mechanism 220 may be an alternate evaluator. The alternate evaluator may be configured to cache an entire directory store. The directory store may be a persistent storage mechanism. Both read and write operations may be evaluated in relation to the alternate evaluator. Data may be read from the alternate evaluator and operations that add or modify data may be written to the alternate evaluator.

Evaluation module 230 may be configured to determine whether directory server 200 is equipped to perform a received directory service operation. For example, directory server 200 may not be equipped to perform a read operation if its accessible storage mechanism(s) is empty. According to some embodiments of the invention, evaluation module 230 may consider only the contents of non-persistent storage mechanism 220 in determining whether directory server 200 may perform a received directory service operation. In other embodiments, evaluation module 230 may consider non-persistent storage mechanism 220 in addition to other storage mechanisms. Additionally, evaluation module 230 may be configured to perform the requested operation. Directory server knowledge module 240 may be configured to query other directory servers within a directory service network to resolve an operation that evaluation module 230 has determined may not be performed by directory server 200.

Figure 3:
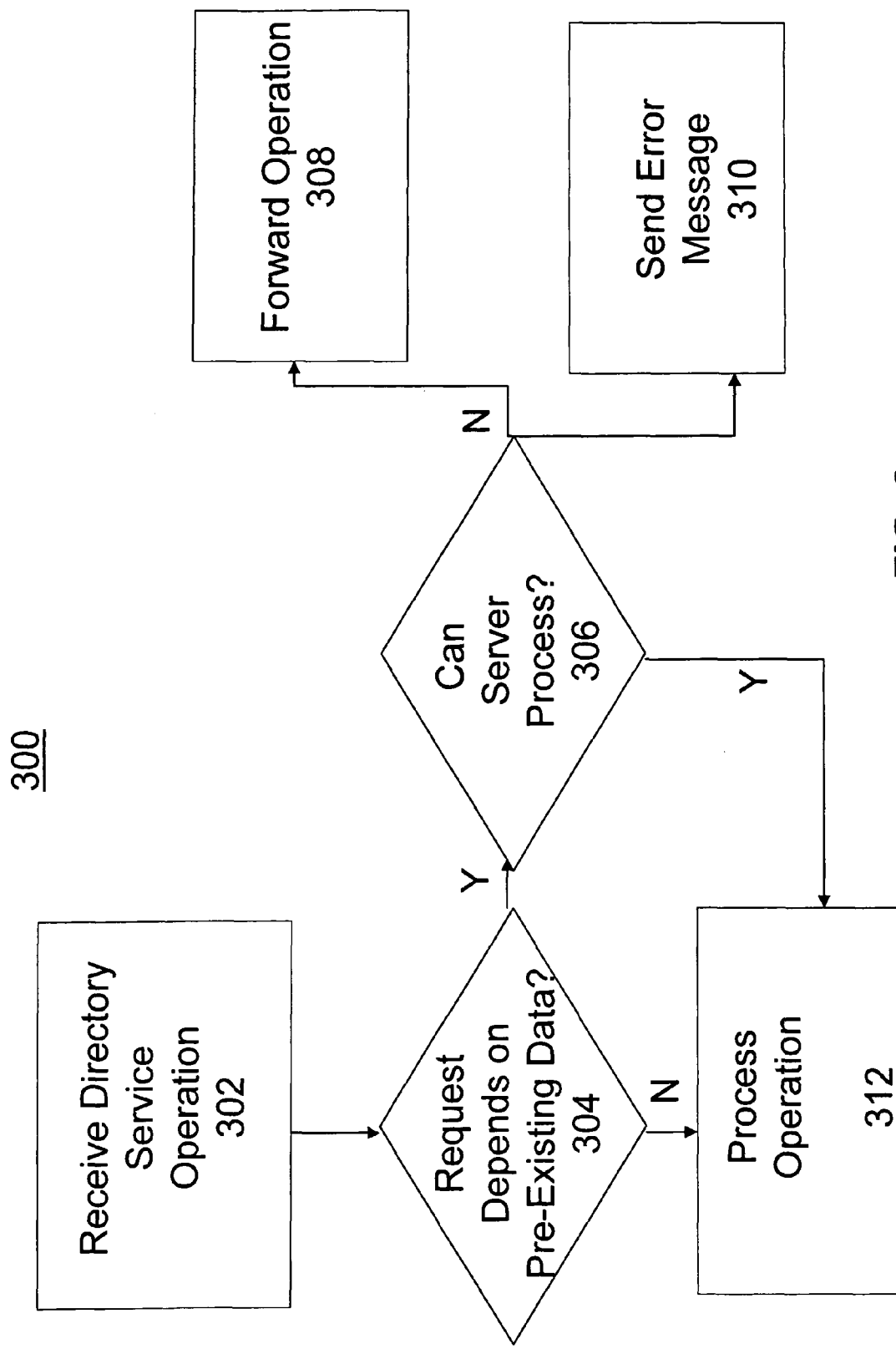
FIG. 3 illustrates a process for evaluating a directory service operation, in accordance with various embodiments of the invention.

FIG. 3 depicts a process 300 for receiving and evaluating a directory service operation, according to various embodiments of the invention. As depicted at 302, a directory server may receive a directory service operation. The directory server may determine what type of operation it has received. For example, the operation may be an add, modify, search, remove, or other directory service operation.

The directory server may then determine whether the received operation depends on existing information, as depicted at 304. For example, to perform a search operation, the server must have access to an information storage mechanism that already includes data. For an add operation, the server need not have access to a storage mechanism that contains data.

If the operation does depend on existing information, the directory server may then determine whether it is able to process the operation, as depicted at 306. As described above, a directory server may be configured to evaluate a directory service operation solely with respect to its associated non-persistent storage mechanism or to additionally evaluate an operation with respect to other storage mechanisms. Thus, the directory server may determine whether it has access to the stored data. According to some embodiments of the invention, a non-persistent storage mechanism may be loaded or pre-configured with information from persistent or non-persistent storage mechanism, or other directory servers after which the directory server may commence evaluation of operations. In other embodiments, data may be loaded into the non-persistent storage mechanism via add operations, after which more complex operations such as search, compare, read, list, modify, rename, delete, and/or other operations, may be performed.

If the directory server is unable to process the directory service operation, it may, according to some embodiments, query another server to process the request, as depicted at 308. Alternatively, the server may respond with a message indicating it is unable to complete the request, as depicted at 310.

As depicted at 312, the directory server may perform the directory service operation. According to some embodiments of the invention, the server may store the result of the directory service operation to its non-persistent storage mechanism. A directory server, according to some embodiments of the invention, may include or interface to a persistent storage mechanism in addition to a non-persistent storage mechanism. As such, certain predefined categories of data may be written to the persistent storage mechanism. For example, configuration data may be stored in the persistent storage mechanism and may be retrieved and/or updated as required. Additionally, certain types of data may be stored and/or pre-loaded in the persistent storage mechanism and may be used during evaluation of a particular operation.

Figure 4:
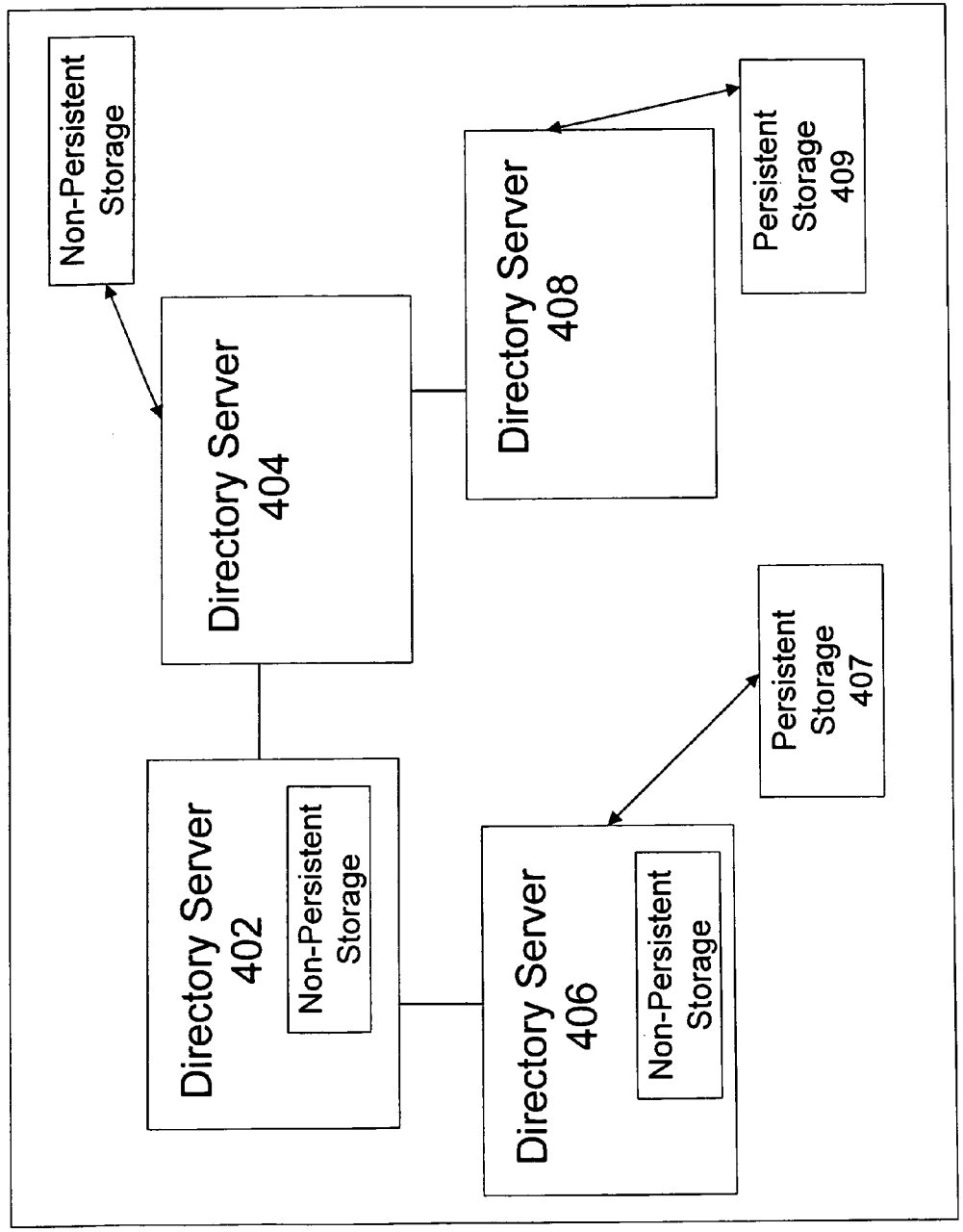
FIG. 4 illustrates a directory service network, in accordance with various embodiments of the invention.

FIG. 4 depicts another example of a directory service network, in accordance with various embodiments of the invention. Directory service network 400 may include a plurality of directory servers 402-408. Directory servers 402-408 may be any type of directory server and may interface to a non-persistent and/or persistent storage mechanism. Directory servers 402-408 may be replicated servers, each providing the same type of information, according to some embodiments of the invention. In other embodiments of the invention, directory servers 402-408 may form a distributed network, wherein one or more of directory servers 402-408 store certain types or categories of data.

As depicted in FIG. 4 by way of example only, directory server 402 includes an internal non-persistent storage mechanism, directory server 404 interfaces to an external non-persistent storage mechanism, directory server 406 includes a non-persistent storage mechanism and additionally interfaces to external persistent storage mechanism 407, and directory server 408 interfaces to external persistent storage mechanism 409. Other server configurations may be used. For example, each server may interface only to non-persistent storage mechanisms.

Figure 5:
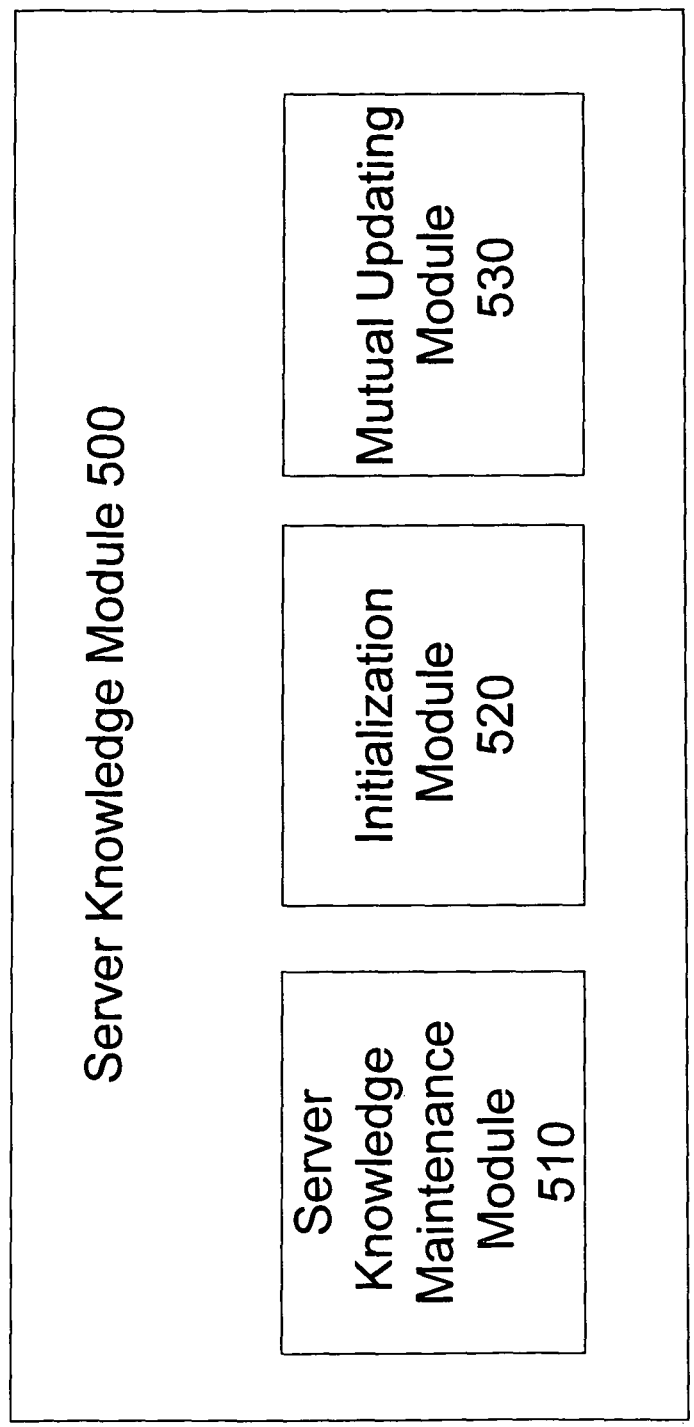
FIG. 5 illustrates a directory server knowledge module, in accordance with various embodiments of the invention.

As described above, each directory server may include an evaluation module and a directory server knowledge module. FIG. 5 depicts an exemplary directory server knowledge module, in accordance with various embodiments of the invention. Directory server knowledge module 500 may include one or more sub-modules such, for example, server knowledge maintenance module 510, initialization module 520, and mutual updating module 530.

Server knowledge maintenance module 510 may be used to maintain a list of all servers in directory service network 400. The list may provide information such as, for example, a name associated with the directory server, a network address associated with the directory server, a location of the server, the server status, the type of data maintained by the server, and/or other information. Information maintenance module 510 may be configured to update information a directory server in the directory service network and to add new servers to the server list. According to some embodiments of the invention, each server maintains a server list. In other embodiments of the invention, a dedicated server may be configured to maintain the server list.

Mutual updating module 530 may be configured to enable one or more servers in a directory service network to share received directory service updates with one or more other servers in the network.

Figure 6:
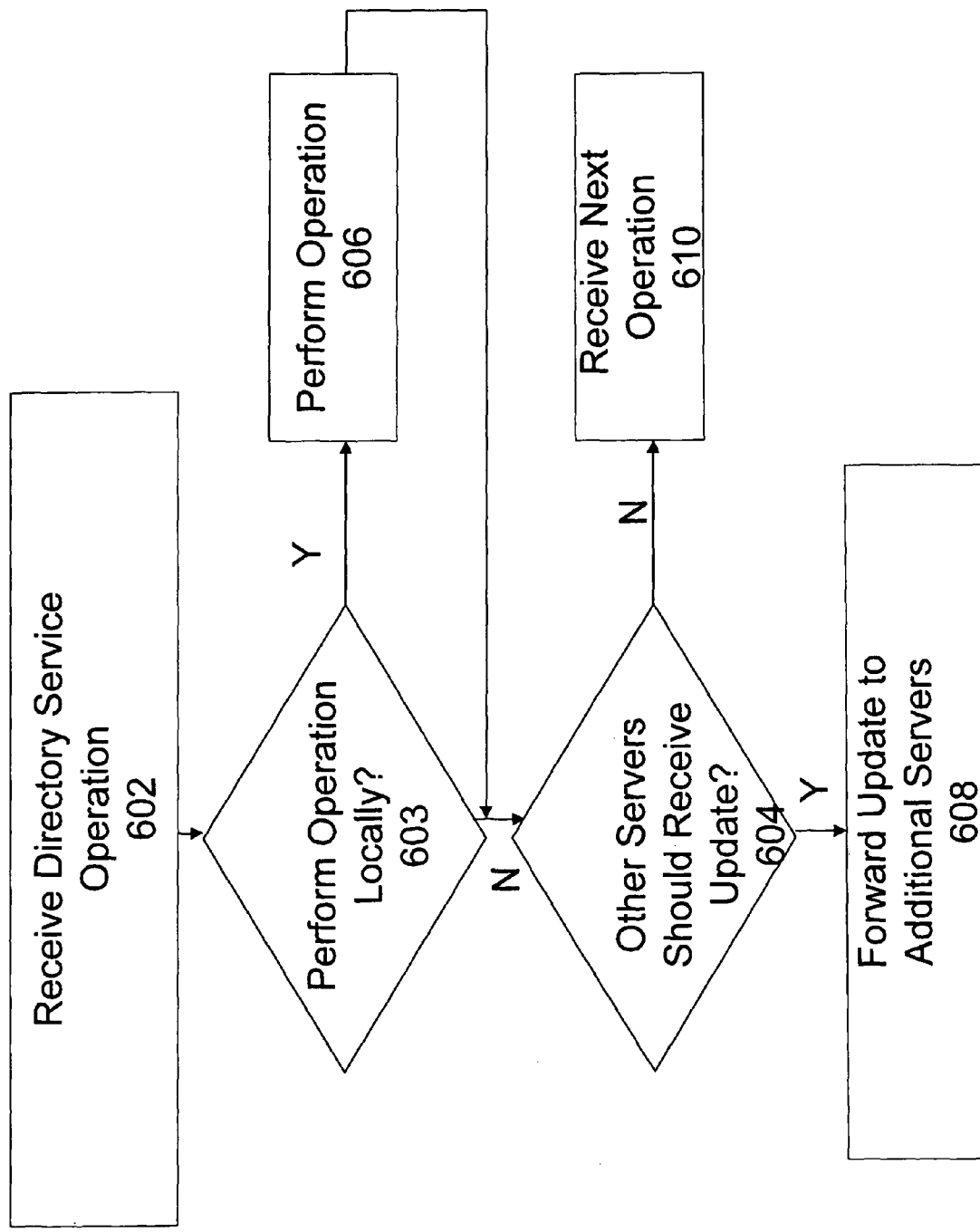
FIG. 6 illustrates a process for mutually updating directory server, in accordance with various embodiments of the invention.

FIG. 6 depicts a process 600 for mutually updating a directory server in a directory server network. As depicted at 602, a directory server may receive a directory service update operation. The directory server may then determine whether the update operation should be applied locally to its directory store, as depicted at 603. For example, the receiving directory server may determine whether the update operation refers to the type of data stored in its directory store. If it is determined that the operation should applied locally, the operation is performed as depicted at 606.

The receiving server may determine whether there are other directory servers within the directory service network that should receive the update whether or not the operation was performed locally, as depicted at 604. As described above, a directory server may include a directory server knowledge module which may maintain a knowledge list. The knowledge list may include information about other servers in the network. Determining whether another directory server should receive the update may include, for example, determining whether the other servers store the same type of information, whether the other servers interface to a persistent or non-persistent storage device, and/or other criteria.

If there are no additional servers in the receiving server's knowledge list which should receive the update, the receiving server may simply wait to receive the next operation, as depicted at 610. If there are additional servers in the network directory server list, the receiving server may forward the update to the additional server, as depicted at 608. According to some embodiments of the invention, replication to other servers in the directory server network occurs after confirming the operation with the requesting client device. In other embodiments, replication may occur before confirming the update with the requesting client device. For example, replication to servers which interface to a persistent storage mechanism may be performed after confirming the operation with the client device while replication to servers which interface to a non-persistent storage mechanism may be performed before confirming the operation.

Mutually updating the additional servers may be performed using various synchronization or replication techniques. Table 1 illustrates an exemplary list of techniques that may be used to perform the mutual updating process. Other techniques may be used.

TABLE 1

| Technique | Description |
| --- | --- |
| Write-Behind (Asynchronous) Replication | Update to another server occurs outside the update transaction |
| Write-Through (Synchronous) Replication | Update to another server occurs inside the update transaction |
| Replay-Based Replication | Every Update to one server is applied to another server |
| State-Based Replication | Final state of one or more changes in conveyed to another server |
| Meshed Replication | Server is capable of updating another server directly |
| Cascading Replication | Mutual update propagates through the network from one server to another |
| Tiered Replication | Mutual update propagates through the network in a hierarchy |
| Multi-Master Replication | Any server may receive client update operations and replicate them to another server |
| Preferred-Master Replication | System has an order of preference when it needs to replicate to another server |
| Master-Slave Replication | Slave servers do not receive client update operation and are only updated via a master server |
| Full Replication | Each replicated server receives a complete copy of information from another server |
| Selective Replication | Subset of information is replicated from one server to another |
| On-Demand Replication | Replication to another server occurs at the time of the update |
| Batch Replication | Replication to another server occurs at predetermined time or event |

Initialization sub-module 520 may be configured to enable a directory server to receive information stored by a second directory server in the network, prior to bringing the server online. In a replicated directory server network, a new directory server may be initialized by any other directory server in the directory service network. In a distributed directory service network, a new directory server may serve as a replica for one or more other servers in the network. As such, the newly added server may be initialized by the one or more server in the network for which it is a replica.

Figure 7:
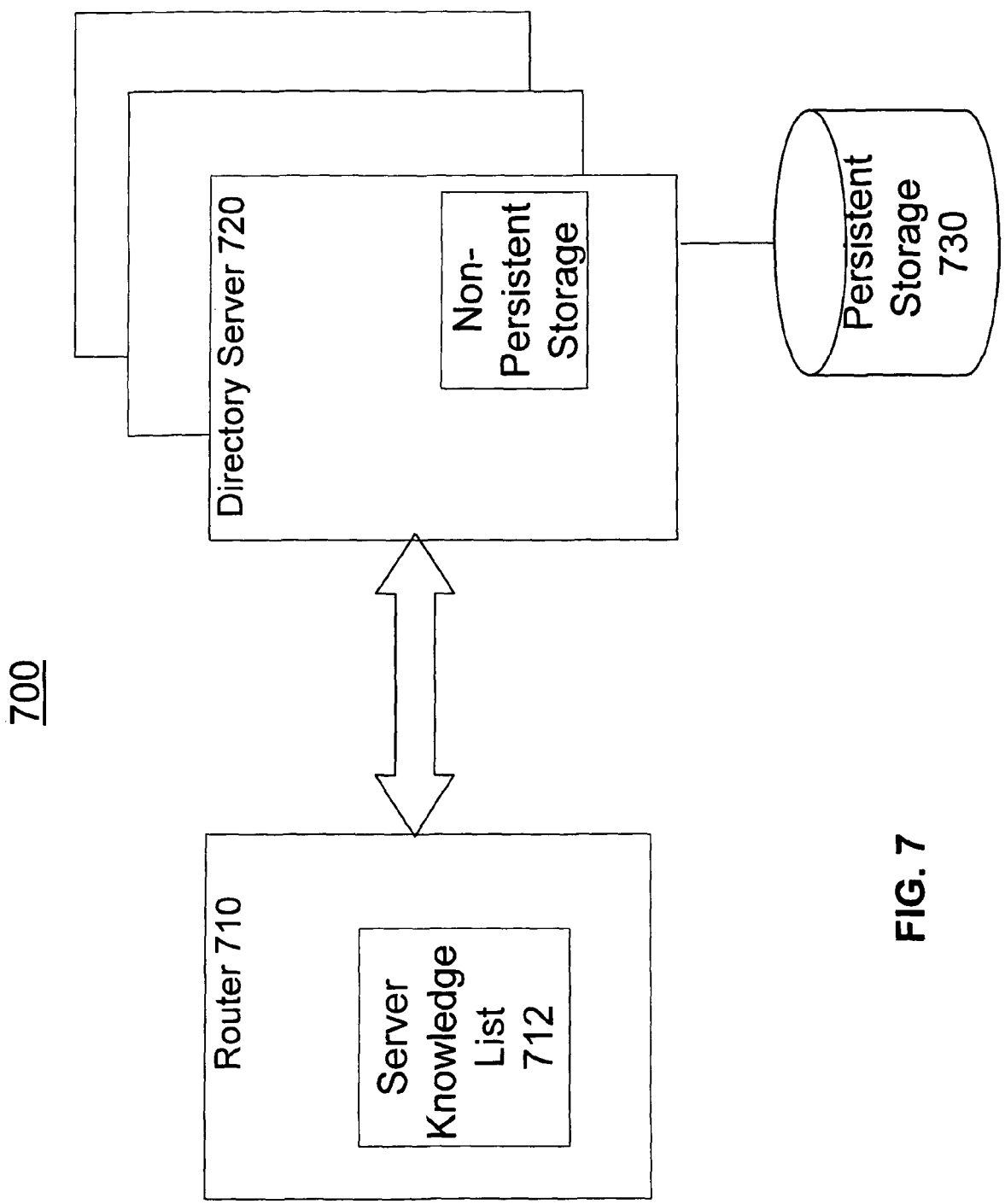
FIG. 7 illustrates a directory service network, in accordance with various embodiments of the invention.

According to various embodiments of the invention, a routing function may be used to increase the performance of a directory service network. FIG. 7 depicts a system 700 for improving the performance of a directory service network. System 700 may include router 710 communicatively coupled to one or more directory servers 720. Additional routers may be included.

Router 710 may include a server knowledge list 712. Server knowledge list 712 may provide a list of servers in the network, and an indication of each server's status and/or other information. Status information may include, for example, an indication of the server's availability, a time associated with the last operation performed by the server, and/or other status information. A server may be unavailable, for example, if the server is offline, recovering from another operation, busy, or otherwise marked unavailable.

Server knowledge list 712 may also include information identifying the type or category of information managed by each server. In a replicated environment, multiple servers may serve the same information, whereas in a distributed environment, each server may serve a specific subset of information. In either environment, a client making a request need not be aware of the server allocation.

According to some embodiments of the invention, router 710 may be a directory server adapted to perform one or more routing functions. For example the router may be adapted to perform functions such as load sharing, fail-over, fail-back, and/or other routing functions. If router 710 is configured for fail-over and directs an operation to a server that fails, the operation can be redirected to another server without interrupting the client application. If router 710 is configured for fail-back and a new server is brought online, the new server is configured and used transparently without the need for client input.

As depicted in FIG. 7, each directory server 720 may include a non-persistent information store. One or more persistent storage devices 730 may also be provided. Persistent storage device 730 may interface to any one or more of directory servers 720.

Load-sharing between the one or more directory servers 720 may be based on availability and other pre-determined criteria. For example, router 710 may be configured to route directory service operations to one of directory servers 720 in a round robin fashion wherein each server in turn receives a request. In some embodiments, the directory server having the least number of queued requests may be chosen by router 710. Other methods of choosing a directory server may be used such as, for example, choosing randomly, defining directory server precedence, operation complexity, operation type, security classification, and/or other methods.

Figure 8:
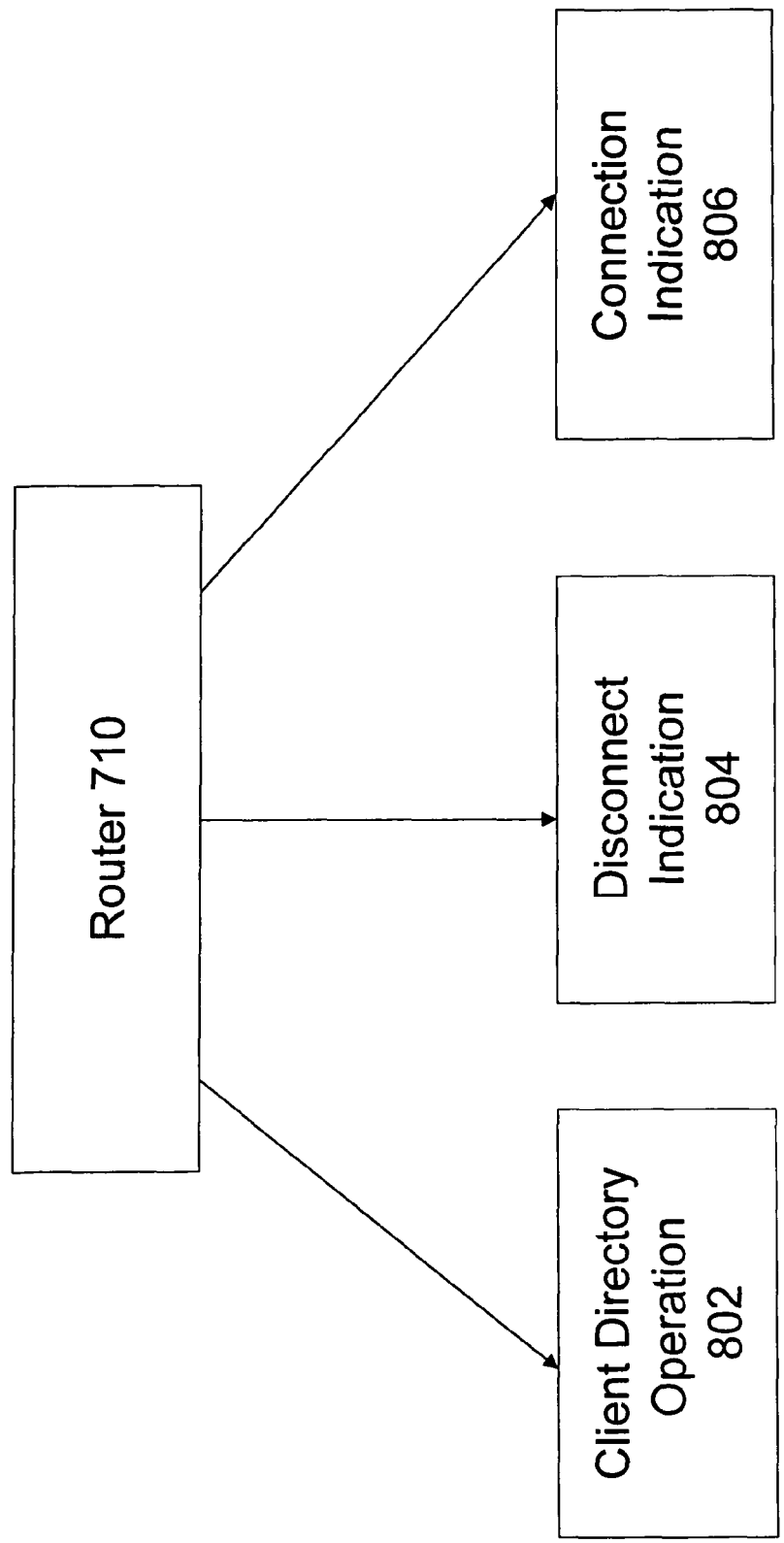
FIG. 8 depicts a plurality of directory service operations, in accordance with various embodiments of the invention.

Router 710 may be configured to respond to a plurality of events. As depicted in FIG. 8, router 710 may be configured to respond to the receipt of a client directory operation request, as depicted at 802, receipt of a disconnect indication, as depicted at 804, receipt of a connection indication, as depicted at 806, and/or other events.

A router receiving a directory operation request may be adapted to forward the request to a directory service that can handle the request. This process, is known as navigation or chaining, and may be based on a unique attribute provided in the directory operation request. For example, deciding where to forward the request may be based on the distinguished name in the request. As described above, the distinguished name is a collection of attributes that make up a directory entry. Using the distinguished name, the router may locate a directory service that manages a namespace that includes the directory name of the target entry.

Figure 9:
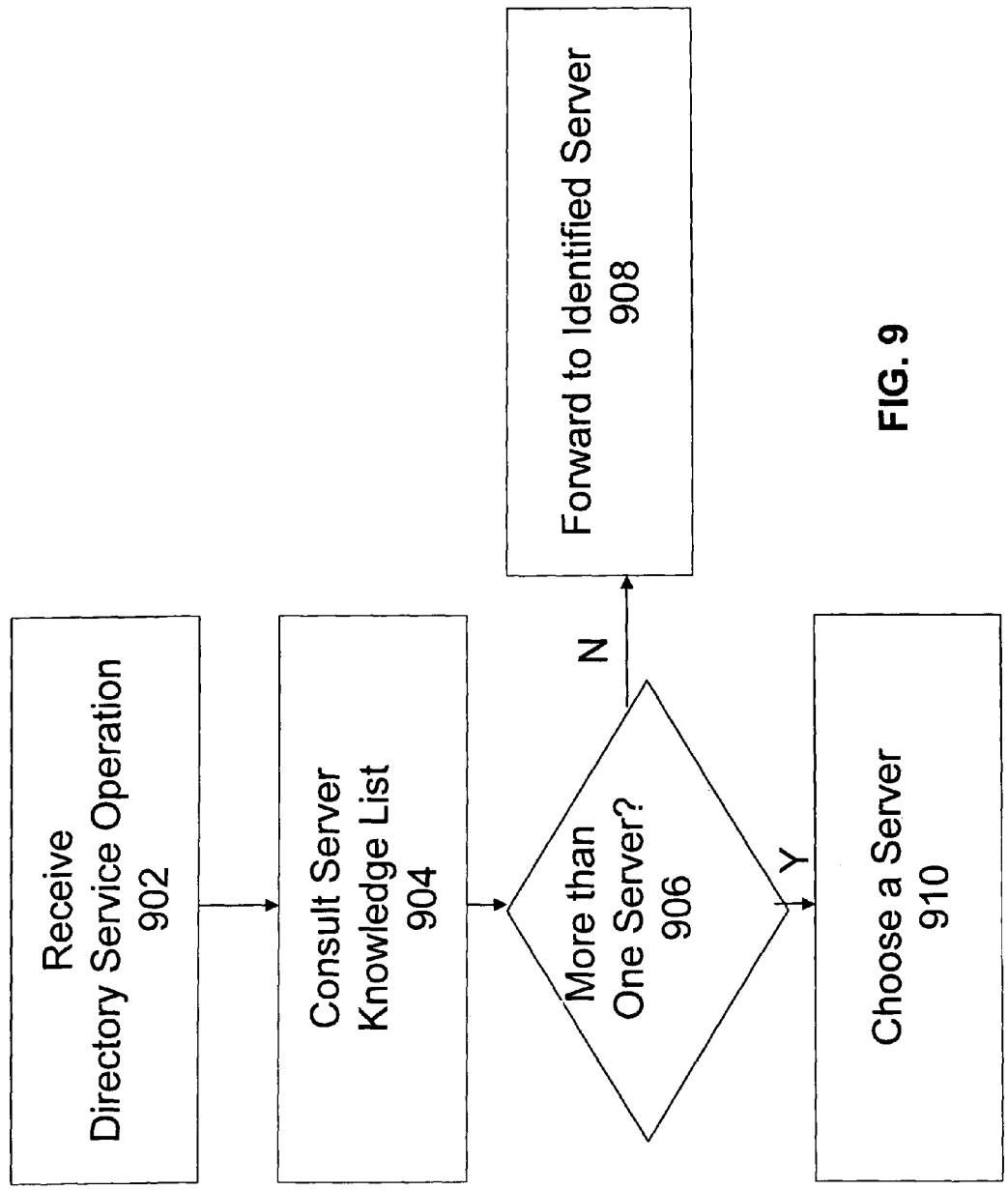
FIG. 9 depicts a process for selecting a server to respond to a directory service operation, in accordance with various embodiments of the invention.

FIG. 9 depicts a process 900 for determining a server which is capable of responding to a directory service operation and forwarding a directory operation request to the determined server. As depicted at 902, a router in a directory service network may receive a directory operation request. Upon receipt of the request, the router may consult its server knowledge list to determine one or more directory servers that may service the request, as depicted at 904. If no servers are available, the router may return an error response to the client.

The directory operation request may include, among other things, a distinguished name associated with the operation. As such, the router may determine which one or more servers manage the provided distinguished name. Other criteria may be used, as would be apparent.

As described above, one or more servers may be capable of responding to a directory operation request. As depicted at 906, a determination is made as to whether more than one server may service the request. The router may consult its knowledge list to determine whether more than one server manages the information identified in the directory operation request. If only one server is identified in the knowledge list, the request is forwarded to the identified server, as depicted at 908. If more than one server may respond to the request, the router may choose a server, as depicted at 910.

The router may determine which of the two or more directory servers to route a directory operation request to based on availability. A server may be unavailable if it is offline, recovering from another operation, busy, or otherwise marked unavailable. In addition to availability, a variety of methods to determine whether a directory operation request should be routed to a server. As described above, this evaluation may be based on one or more of round robin, least busy, multicast, random, preferred server rankings, operation type, operation complexity, security, or any other suitable determination method. For example, if available servers are evaluated using least busy and preferred, the router first determines which server is least busy and then of those which is highest in the preference list. Once a server have been chosen, the directory operation request may be forwarded to the chosen server.

A router in a directory service network may additionally be configured to receive server disconnect indications. According to some embodiments of the invention, a router may receive a disconnect indication due to a server or network failure. Upon receipt of a disconnect indication, the router may mark the server as unavailable in its server availability list. The router may additionally store the time the disconnect indication was received. As such, the router may then send a connection request to the failed server after a pre-defined time-out period has elapsed if the server does not automatically reconnect.

The router may also receive connection indications from one or more directory servers joining the directory service network. When a new server comes online, it may be added to the router's available server list. Furthermore, the router may receive a connection indication when a previously failed server comes back online. The router may then unmark its failure in the availability list.

While the invention has been described with reference to the certain illustrated embodiments, the words that have been used herein are words of description, rather than words of limitation. Changes may be made, within the purview of the associated claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the associated claims.

What is claimed is:

1. A method of routing directory service operations in a directory service network that supports a hierarchical structure of directory entries, wherein the directory service network comprises a plurality of directory servers, the method comprising:

receiving, at a router, a directory service operation relating to a directory entry;

determining that one of the plurality of directory servers has been disconnected or is unavailable;

marking the one of the plurality of directory servers as disconnected or unavailable in the directory server knowledge list, the marking comprising marking a time associated with the determination of the one of the plurality of directory servers as disconnected or unavailable;

determining, at a processor, which one or more of the plurality of directory servers are able to process the directory service operation by more than merely transmitting or receiving the directory service operation, wherein the determination is made using, at least in part, a directory server knowledge list, the directory server knowledge list comprising a type of information served by each of the plurality of directory servers;

selecting, at the processor, one of the plurality of directory servers based at least in part on the determination of ability to process the directory service operation; and routing, by the router, the directory service operation to the selected directory server.

2. The method of claim 1, wherein the directory server knowledge list further includes a status associated with each of the plurality of directory servers.

3. The method of claim 1, wherein the determining the one or more directory servers that are able to process the directory service operation comprises:

polling each of the plurality of directory servers to determine its availability.

4. The method of claim 1, wherein the determining the one or more directory servers that are able to process the directory service operation comprises:

determining which of the plurality of directory servers stores data identified in the directory service operation based, at least in part, on a unique attribute associated with the directory entry, wherein the unique attribute is identified in the directory service operation.

5. The method of claim 4, wherein the unique attribute includes a distinguished name.

6. The method of claim 1, wherein the determining one or more of the plurality of directory servers that are able to process the directory service operation further comprises determining one or more of the following: whether the one or more of the plurality of directory servers are offline, whether the one or more of the plurality of directory servers have failed, whether the one or more of the plurality of directory servers are recovering, whether the one or more of the plurality of directory servers are busy, whether the one or more of the plurality of directory servers have been designated not to service, or whether the one or more of the plurality of directory servers have been marked unavailable.

7. The method of claim 1, wherein selecting one of the plurality of directory servers is further based on one or more of the following routing techniques: round robin, least busy, multicast, random, or preferred.

8. The method of claim 1, wherein selecting one of the plurality of directory servers is further based on one or more of: the type of the directory service operation, the complexity of the directory service operation, or security.

9. The method of claim 1 further comprising:
receiving indication that one of the plurality of directory servers has been disconnected; and
marking the directory server indicated as disconnected as unavailable in the directory server knowledge list.

10. The method of claim 9, wherein marking the directory server indicated as disconnected as unavailable includes marking a time in which the server disconnection indication was received.

11. The method of claim 9, further comprising:
sending a connection request to the directory server indicated as disconnected after a predefined time interval.

12. The method of claim 1, wherein one or more of the plurality of directory servers are associated with a non-persistent storage mechanism, and wherein the one or more of the plurality of directory servers utilizes the associated non-persistent storage mechanism to store transient directory data.

13. A directory service network that supports a hierarchical structure of directory entries, wherein the directory service network is configured to route a plurality of directory service operations to a plurality of directory servers in the directory service network, the directory service network comprising:
a router configured to receive a directory service operation relating to a directory entry, the router comprising a processor configured to:
maintain a directory server knowledge list that comprises a type of information served by each of the plurality of directory servers;
determine that one of the plurality of directory servers has been disconnected or is unavailable and mark the one of the plurality of directory servers as disconnected or unavailable in the directory server knowledge list;
determine which one or more of the plurality of directory servers are able to process the directory service operation by more than merely transmitting or receiving the directory service operation, wherein the determination is made, at least in part, using the directory server knowledge list and the determination comprises determination of which of the plurality of directory servers stores data identified in the directory service operation based, at least in part, on a unique attribute associated with the directory entry, wherein the unique attribute is identified in the directory service operation;
select one of the plurality of directory servers based at least in part on the determination of ability to process the directory service operation; and
route the directory service operation to the selected directory server.

14. The directory service network of claim 13, wherein one or more of the plurality of directory servers are associated with a non-persistent storage mechanism, and wherein the one or more of the plurality of directory servers utilizes the associated non-persistent storage mechanism to store transient directory data.

15. A router configured to receive a directory service operation and to forward the directory service operation to one or more of a plurality of directory servers in a directory service network, wherein the directory service network supports a hierarchical structure of directory entries, the router comprising:
a directory server knowledge module associated with a processor configured to maintain information about the plurality of directory servers, the directory server knowledge module comprising a directory server knowledge list comprising a type of information served by each of the plurality of directory servers;
an evaluation module associated with the processor configured to:
determine which one or more of the plurality of directory servers are able to process a directory service operation by more than merely transmitting or receiving the directory service operation based, at least in part, on the directory server knowledge list, wherein the directory service operation relates to a directory entry and the determination comprises determination of which of the plurality of directory servers stores data identified in the directory service operation based, at least in part, on a distinguished name associated with the directory entry, wherein the distinguished name is identified in the directory service operation and comprises a collection of attributes, and
select one of the plurality of directory servers based at least in part on the determination of ability to process the directory service operation; and
a routing module associated with the processor configured to route the directory service operation to the selected directory server.

16. The method of claim 15, wherein the distinguished name comprises a name of the directory entry associated with the distinguished name concatenated with names of ancestors of the directory entry in the hierarchical structure of directory entries.

17. The router of claim 15, wherein one or more of the plurality of directory servers are associated with a non-persistent storage mechanism, and wherein the one or more of the plurality of directory servers utilizes the associated non-persistent storage mechanism to store transient directory data.

* * * * *